United States Patent
Cook et al.

(10) Patent No.: US 8,310,300 B2
(45) Date of Patent: Nov. 13, 2012

(54) CHARGE PUMP HAVING RAMP RATE CONTROL

(75) Inventors: Thomas D. Cook, Austin, TX (US); Jeffrey C. Cunningham, Austin, TX (US); Karthik Ramanan, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 118 days.

(21) Appl. No.: 12/870,464

(22) Filed: Aug. 27, 2010

(65) Prior Publication Data

US 2012/0049917 A1    Mar. 1, 2012

(51) Int. Cl.
G05F 1/10    (2006.01)
G05F 3/02    (2006.01)

(52) U.S. Cl. ........................................................ 327/536
(58) Field of Classification Search .......... 327/536–537; 363/59–60; 307/109–110
See application file for complete search history.

(56) References Cited

U.S. PATENT DOCUMENTS

| | | | |
|---|---|---|---|
| 4,326,134 A | 4/1982 | Owen et al. | |
| 5,168,174 A | 12/1992 | Naso et al. | |
| 5,222,111 A * | 6/1993 | Muramatsu | 377/49 |
| 5,365,121 A | 11/1994 | Morton et al. | |
| 5,563,779 A * | 10/1996 | Cave et al. | 363/59 |
| 5,801,987 A | 9/1998 | Dinh | |
| 5,945,870 A | 8/1999 | Chu et al. | |
| 6,320,796 B1 * | 11/2001 | Voo et al. | 365/189.09 |
| 6,693,410 B1 | 2/2004 | Terrien | |
| 6,724,241 B1 | 4/2004 | Bedarida et al. | |
| 6,980,047 B1 | 12/2005 | Kuo | |
| 7,123,067 B2 * | 10/2006 | Yasui et al. | 327/178 |
| 7,542,351 B2 | 6/2009 | Choy et al. | |
| 7,630,250 B2 | 12/2009 | Binboga | |
| 2005/0057675 A1 * | 3/2005 | Lee et al. | 348/308 |
| 2009/0097285 A1 | 4/2009 | Cook et al. | |
| 2009/0168586 A1 | 7/2009 | Chan et al. | |

* cited by examiner

Primary Examiner — Quan Tra
(74) Attorney, Agent, or Firm — James L. Clingan, Jr.

(57) ABSTRACT

A charge pump includes a first counter and a pump stage. The first counter has a control input for receiving a control signal, and an output for providing a first count value. The first count value is incremented in response to the control signal being a first logic state and the first count value is decremented in response to the control signal being a second logic state. The pump stage has a variable capacitor. The variable capacitor has a control input coupled to the output of the first counter for receiving the first count value. The capacitance value of the variable capacitor is changed in response to the first count value changing. The capacitance value is for determining a ramp-up rate of an output voltage at an output of the charge pump.

15 Claims, 5 Drawing Sheets

CHARGE PUMP HAVING RAMP RATE CONTROL

BACKGROUND

1. Field

This disclosure relates generally to charge pumps, and more specifically, to charge pumps having ramp rate control.

2. Related Art

Charge pumps are commonly required for use with non-volatile memories (NVMs) because voltages required for effective program and erase are greater than the power supply voltages. Some NVM technologies require a charge pump voltage with a controlled ramp rate. Typically the ramp rate is either controlled by a shunt current Ish that consumes some of the charge produced by the pump as shown in FIG. 1. As an alternative the size of the charging capacitor is adjusted to modulate the amount of charge produced by the pump as shown in FIG. 2. In each case the ramp rate is proportional to the size of a smoothing capacitor (Csm) and a load capacitor Cl, and the magnitude of the load Ild and shunt currents Ish. The ramp rate is inversely proportional to the charging capacitor (Cp) and the clock frequency.

Selecting a shunt current or a charging capacitor size can be complicated by the variability of the load capacitance and current and overall power consumption. Those values will depend on the number of bits that are programmed; precise control of the ramp rate for all operating conditions using prior art is therefore impossible. The situation can be mitigated somewhat by selecting a large smoothing capacitor that swamps the effect of changing load capacitance and current at the expense of die area and increased power consumption during ramping. Without the increase in smoothing capacitor an increase in load can dramatically slow the ramp rate as illustrated in the simulation shown in FIG. 3 that compares two loads, one of which is 2.5 times the other. For the simulation shown in FIG. 3 the pump consisted of a single stage with 3V input and 5V regulation point.

Thus there is a need for a charge pump that improves upon one or more of issues raised above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In one aspect, a charge pump has a counter that provides an output to a digital to analog (D/A) converter which in turn provides an analog signal to a comparator. The comparator compares the output of the D/A converter to the output of the charge pump to determine if the output is following the desired ramp rate. If a faster ramp rate is desired, more capacitance is added to the pumping process. If the ramp rate exceeds the desired ramp rate, capacitance is subtracted from the pumping process. This is better understood by reference to the drawings and the following description.

Figure 1:
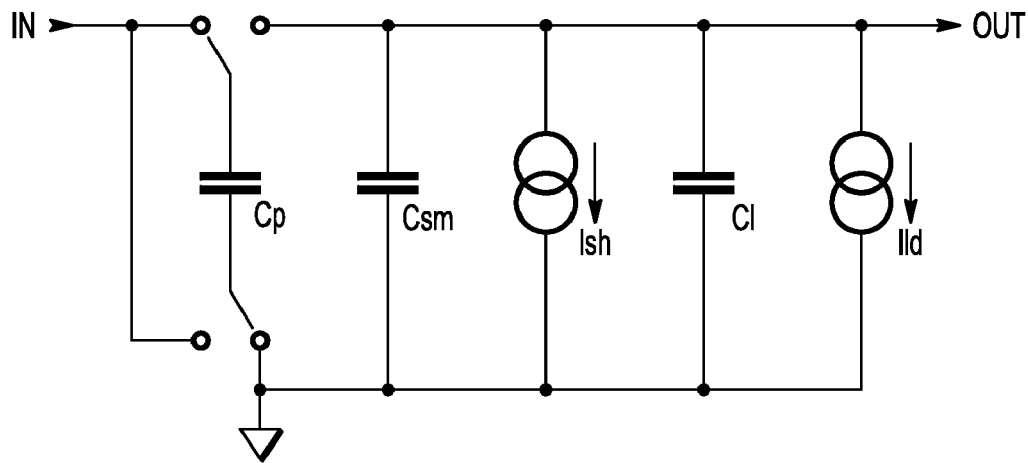
FIG. 1 is a circuit diagram of a charge pump of the prior art of a first type.
Figure 2:
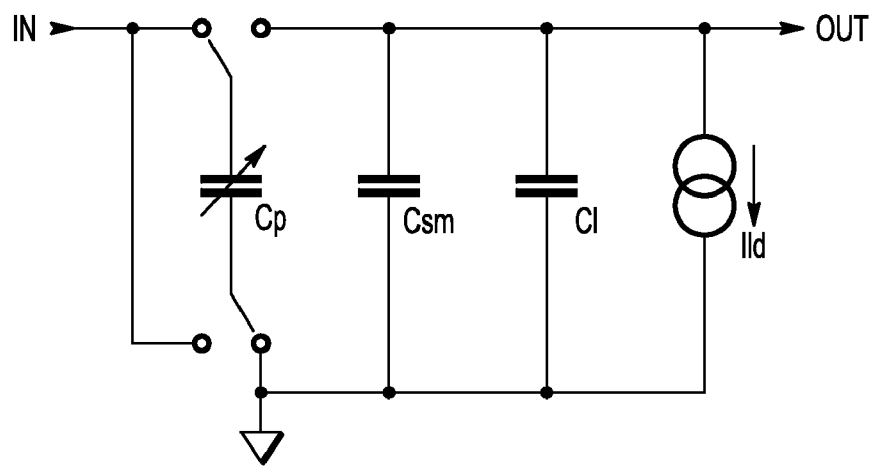
FIG. 2 is a circuit diagram of a charge pump of the prior art of a second type.
Figure 3:
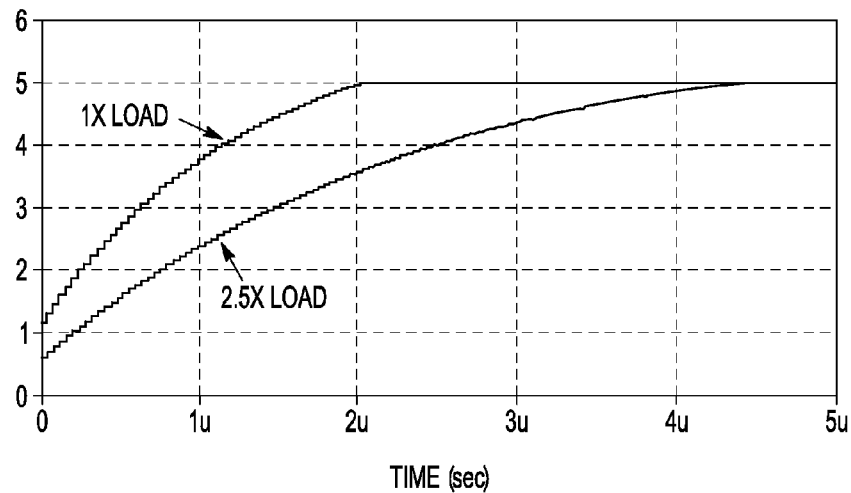
FIG. 3 is a graph showing a charge pump characteristic of the prior art.
Figure 4:
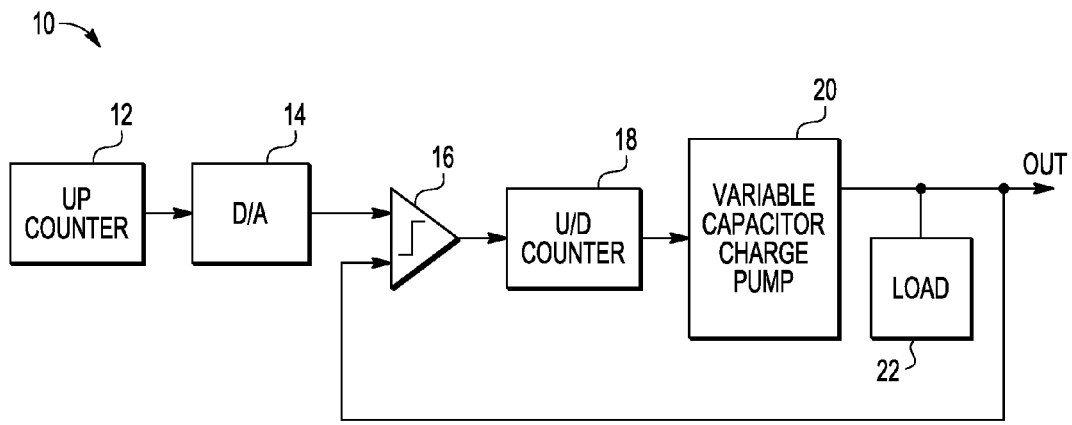
FIG. 4 is a circuit diagram of a charge pump that controls a ramp-up of the output voltage.

FIG. 4 shows a charge pump that can control its ramp rate independently from its load. During each clock cycle it compares the pump output value to the desired output value for that cycle and adjusts the value of the charging capacitor to increase or decrease the ramp rate. FIG. 4 shows a charge pump 10 comprising an UP counter 12, a D/A converter 14 having an input coupled to the output of UP counter 12, a comparator 16 having a first input coupled to the output of D/A converter 14, an up/down (U/D) counter 18 having an input coupled to the output of comparator 16, a variable capacitor charge pump 20 having an input coupled to the output of U/D counter 18, and a load 22 coupled to an output of variable capacitor charge pump 20. The output of variable capacitor charge pump 20 is the output of charge pump 10 and is coupled to a second input of comparator 16. Variable capacitor charge pump 20 may be referenced as pump stage having a variable capacitor.

The output value of UP counter 12, which increases with each clock, is converted to an analog voltage value by D/A converter 14 and the voltage value is applied to the first input of comparator 16. The output value of a counter may be referenced a count value. Since the second input of comparator 16 is connected to the output of pump 20, the output of comparator 16 will be the sign of the difference between the output value of D/A converter 14 and the output value, Vout, of pump 20. If the output value of pump 20, Vout, is greater than the output value of D/A converter 14, the amount of charging capacitance of pump 20 is reduced and the incremental increase in the change of the pump 20 output value, Vout, is decreased during the succeeding clock period. If the pump 20 output value is less than the output value of D/A converter 14, DAout, the amount of the charging capacitance of pump 20 is increased and the incremental increase in the change of the pump 20 output value, Vout, is increased during the succeeding clock period. Thus the ramp rate for the output voltage of pump 10, Vout, will be determined by the LSB size of the D/A converter 14 and the Up counter 12 clock frequency.

Figure 5:
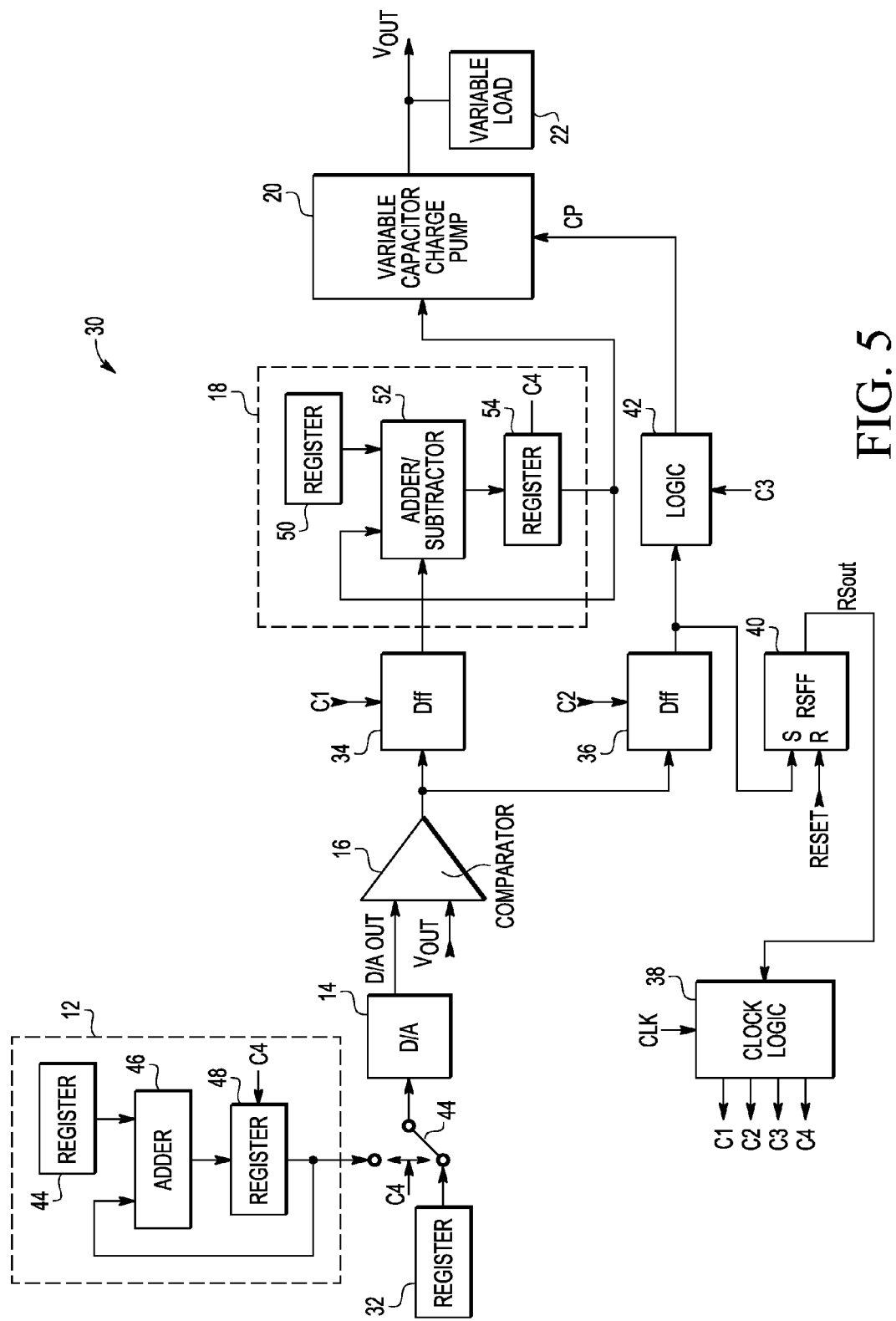
FIG. 5 is a circuit diagram of a charge pump of FIG. 4 with additional features.

Other ramp rates can be generated by replacing up counter 12 with an adder. In that case the slowest ramp rate is generated by adding a value of one at each clock period; faster ramp rates are generated by adding a larger value at each clock period. To compensate for faster ramp rates the change in the pump capacitor can also be adjusted by replacing up-down counter 18 with an adder/subtractor as shown in FIG. 5. FIG. 5 shows a charge pump 30 with circuitry added to charge pump 10 of FIG. 4 and also shows UP counter 12 and U/D counter 18 in more detail. In order to detect the time when the output voltage value of pump 20 equals the desired regulation voltage value during the ramping process, the input of comparator 16 can be multiplexed between the ramp rate control voltage value and the regulation voltage value by adding register 32 and switch 44 to the input of D/A converter 14 and two D flip-flops (DFFs), 34 and 36, to the output of comparator 16.

As shown in FIG. 5 charge pump 30 includes clock logic 38, logic 42, and RS flip flop (RSFF) 40. Up-counter 12 includes register 45, adder 46, and register 48. U/D counter 18 includes register 50, adder/subtractor 52, and register 54.

Switch 44 has a first terminal coupled to the input of D/A converter 14, a second terminal coupled to the output of register 32, and a third terminal coupled to the output of up-counter 12, which is the output of register 48. The position of the switch is controlled by the state of clock C4. Adder 46 has a first input coupled to the output of register 48, a second input coupled to the output of register 45, and an output coupled to an input of register 48. The loading of register 48 is controlled by the state of clock C4. Adder/subtractor 52 has a first input coupled to the output of register 54, which is also the output of U/D counter 18, a second input coupled to the output of register 50, a control input coupled to an output of DFF 34, and an output coupled to an input of register 54. The loading of register 54 is controlled by the state of clock C4. Registers 50 and 45 contain interval values for incrementing and decrementing U/D counter 18 and incrementing up-counter 12. DFF 34 has a data input coupled to the output of comparator 16, a clock input for receiving clock C1, and an output connected to the control input of adder/subtractor 52. DFF 36 has a clock input for receiving clock C2, a data input coupled to the output of comparator 16, and an output coupled to an input of logic 42 and the set input, S, of RSFF 40. Logic 42 has an input connected to the output of DFF 36, an input connected to clock C3, and an output that provides a pump clock CP. Charge pump 20 has an input coupled to the output of logic 42 (CP in FIG. 5), an input coupled to the output of U/D counter 18 and an output coupled to the second input of comparator 16 as well as load 22. RSFF 40 has a set input, S, coupled to the output of DFF 36, a reset input, R, coupled to RESET, and an output, Rsout, coupled to a control input of clock logic 38. Clock logic 38 has an input connected to the output of RSFF, Rsout, and an input connected to the main clock, CLK. Clock logic 38 provides clocks C1, C2, C3, and C4 in response to master clock CLK. The relationship of these clocks is shown in FIG. 6.

Figure 6:
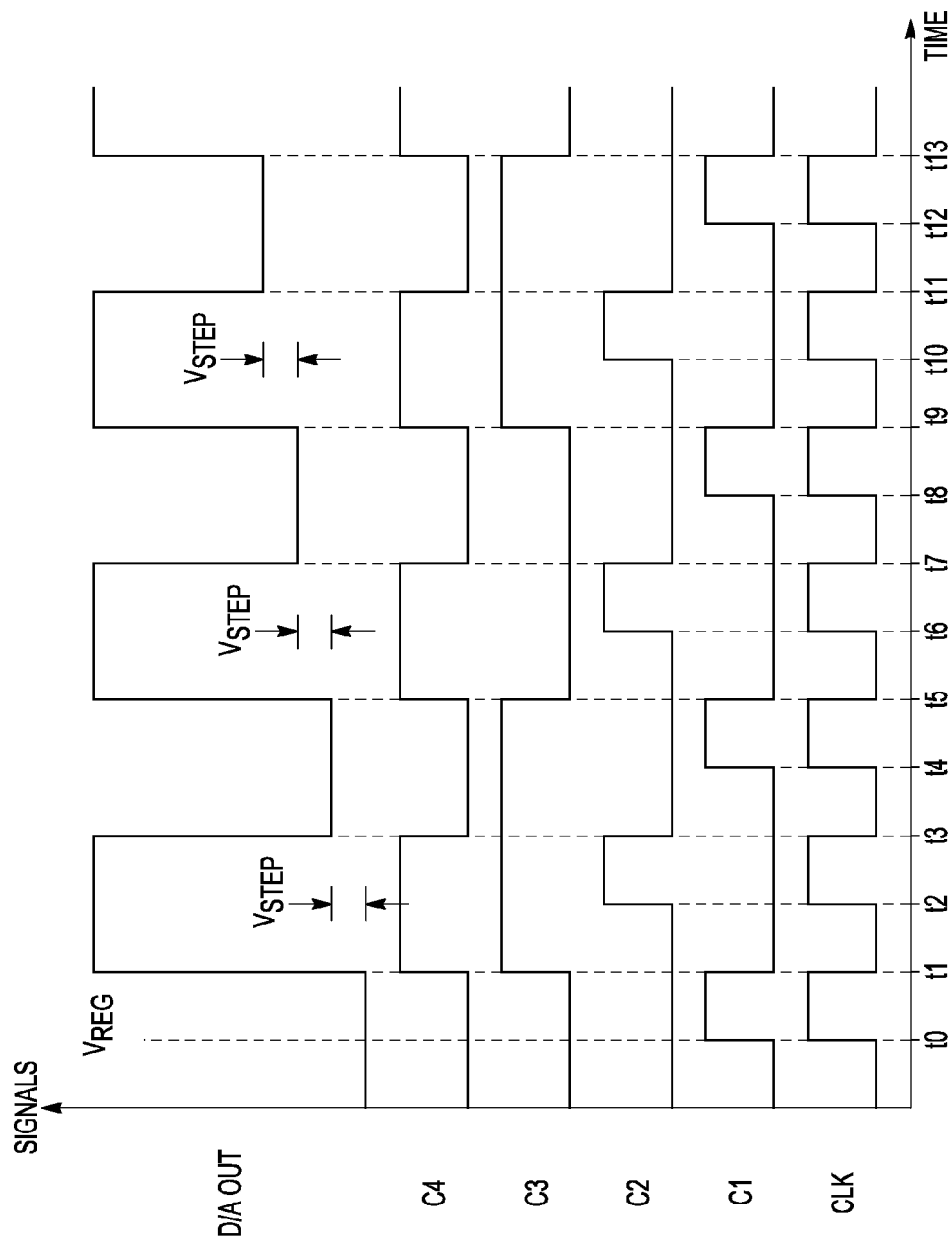
FIG. 6 is a diagram of a plurality of signals present in the charge pump of FIG. 5.

Register 32 contains the D/A input value for regulation (Vreg in FIG. 6). Regulation occurs when the output of pump 20 is controlled to a value close to the value of the desired pump output voltage, such as the voltage value required for programming or erasing NVM. As illustrated in FIG. 6, during the ramping process that precedes regulation the output value of D/A converter 14, DAout, alternates between the regulation value and the ramp control value. During the regulation process (not shown in FIG. 6) the output value of D/A converter 14, DAout, is equal to the regulation voltage value, Vreg. During the ramping process DFF 34 will store the comparator output state in response to a positive edge of clock C1; because of its connection to u/d-counter 18 the output state of DFF 34 will ultimately determine the capacitance value in the variable capacitance charge pump 20. DFF 36 will store the comparator output state in response to a positive edge of clock C2 in FIG. 6; because of its connection to logic 42 the output state of DFF 36 will determine the active condition of the variable capacitance charge pump 20.

For ramp control, register 45 is loaded with an interval value that will determine the amount that the output value of counter 12 is increased during each cycle. Taking the example that register 45 is loaded with "2" and register 48 is loaded with "0", adder 46 provides an output of "2". A positive transition of clock C4 causes Register 48 to change its output to "2" and since the output of register 48 is coupled to an input of adder 46, adder 46 provides an output of "4" in response to the change in the output of register 48. In response to the next positive edge of clock C4, register 48 changes its output to "4" to match the input provided by adder 46, which in turn causes adder 46 to change its output to "6". The process continues with each positive edge of clock C4, sequentially increasing the value presented to switch 44 by "2".

During the ramping process the operation of u/d-counter 18 is similar to the operation of up-counter 12 with the exception that u/d-counter 18 can both increase and decrease the value of its output. Register 50 is loaded with an interval value that will determine the incremental amount of capacitance that will be added to or subtracted from the total capacitance in the variable capacitance charge pump 20. Taking the example that register 50 is loaded with "2" and register 54 is loaded with "8," the output value of the adder/subtractor 52 will be "10" if the output of DFF 34 is logic level high and "6" if the output of DFF 34 is logic level low. A positive transition of clock C4 causes register 54 to change its output such that it is the same value as the output value of the adder/subtractor 52. In response to the change in the output of register 54 the adder/subtractor 52 will change its output to "12" or "4" depending on the state of the output of DFF 34. Also in response to the change in the output of register 54 the variable capacitance charge pump 20 will add or subtract capacitance.

The ramping process begins at time t0 shown in FIG. 6. Clock C1 is active and aligned with master clock CLK while the other clocks, clocks C2, C3 and C4, are at a logic low. Registers 45 and 50 have been loaded with interval values and register 32 has been loaded with the regulation value. Since clock C4 is at a logic low, switch 44 couples the output of UP counter 12 to the input of D/A converter 14. The output value of D/A converter 14 is equal to the first ramp step target voltage level for Vout. Comparator 16 compares the value of D/A converter 14 output, DAout, to the value of Vout; the resulting sign of the difference between the two values is loaded into DFF 34 on the positive edge of clock C1. The output of DFF 34 is connected to the control input of adder/subtractor 52 and determines whether adder/subtractor 52 is configured as an adder or a subtractor; therefore the output of adder/subtractor 52 is either the sum or the difference of the values contained in register 54 and register 50. The output of adder/subtractor 52 is the difference of the two registers when the output of DFF 34 indicates that the value of Vout is greater than the value of DAout, a condition that occurs when the ramp rate is too fast and needs to be decreased. The output of adder/subtractor 52 is the sum of the two registers when the output of DFF 34 indicates that the value of Vout is less than the value of DAout, a condition that occurs when the ramp rate is too slow and needs to be increased. Because the output of adder/subtractor 52 is connected to an input of register 54, the output state of register 54 changes to match the output of adder/subtractor 52 on the positive edge of clock C4 (t1 in FIG. 6); this change causes an appropriate change in the capacitance of pump 20.

At time t1, which is a half cycle of clock CLK after time t0 as illustrated in FIG. 6, clock C4 switches state so that switch 44 connects the output of register 32 to the input of D/A converter 14. In response the output value of D/A converter 14, DAout, is equal to the desired regulation voltage (shown as Vreg in FIG. 6). The output of D/A converter 14, DAout, is connected to the input of comparator 16, which compares the value of Vreg to the value of Vout. Because the output of comparator 16 is connected to the input of DFF 36, DFF 36 will store the output state of comparator 16 at the next positive edge of clock C2, (t2 in FIG. 6). Until the value of Vout exceeds the value of Vreg the output of DFF 36 will not change. Because the output of DFF 36 is connected to logic 42 clock C3 will not be inhibited by logic 42, CP will continue to change in response to changes in clock C3 and the output value of pump 20, Vout, will continue to increase until the value of Vout exceeds the value of Vreg. Since the output of DFF 36 is also connected to the set input, S, of RSFF 40 the value of Rsout will not change until the value of Vout exceeds the value of Vreg. When Rsout changes state clock C4 will be inhibited, switch 44 will continuously connect the output of register 32 to the input of D/A converter 14, and the output value of u/d-counter will not change. The input of D/A converter 14 will alternate between up-counter 12 and register 32, and the output of U/D counter 18 will change until the value of Vout exceeds the regulation value, Vreg.

At time t3 Clock C4 switches to a logic low; as a result switch 44 couples the output of counter 12 to the input of D/A converter 14. Since the output value of counter 12 was increased in response to the previous positive edge of clock C4, the output value of D/A converter 14 after t3 in FIG. 6 will be greater than the D/A converter output value prior to t1 in FIG. 6. As illustrated in FIG. 6 the difference between these two output values is Vstep, which correlates to the value stored in register 45. Comparator 16 determines the sign of the difference between the output value of D/A converter 14, DAout, and Vout; the output state of comparator 16 is stored in DFF 34 on the next positive edge of clock C1 (t4 in FIG. 6). If the value of Vout is greater than the value of DAout the value of the capacitance in the variable capacitance charge pump 20 is too large, therefore adder/subtractor subtracts the value in register 50 from the value in register 54 and the value in register 54 is decreased by an amount equal to the value in register 50 at the next positive transition of C4 (t5 in FIG. 6). If the value of D/A out is greater than the value of Vout the value of the capacitance is too small, therefore adder/subtractor 52 sums the value in register 50 to the value in register 54 so that on the next positive transition of clock C4 (t5 in FIG. 6), the value in register 54 is increased by an amount equal to the value in register 50. Pump 20 responds to the change in the output of counter 18 by increasing or decreasing the value of the capacitance; this results in a change in the value of the voltage change when the pump output is increased at the transition of clock C3 that occurs at t5 in FIG. 6.

At time t5 in FIG. 6 switch 44 again couples the output of register 32 to the input of D/A converter 14. As a consequence the output value of the D/A converter 14, DAout, will again equal the value of Vreg. Comparator 16 again compares the value of DAout and the value of Vout; if the value of Vout is still less than the value of Vreg there will be no change in the output of DFF 36 in response to the next positive edge of clock C2 (t6 in FIG. 6) and thus no change in RSFF or logic 42. Since logic 42 does not inhibit clock C3 the output value of pump 20, Vout, continues to increase in responses to changes in CP. At the next negative edge of C4 (t7 in FIG. 6) switch 44 connects the output of counter 12, which has been increased by the interval value contained in register 45, to the input of D/A converter 14. In consequence the output value of D/A converter 14 equals the next desired ramp value for the time in the ramp process. Since the output of D/A converter 14 is connected to the input of comparator 16, the output state of comparator 16 will change to equal the sign of the difference between DAout and Vout. DFF 34 will store this state at the next positive edge of C1 (t8 in FIG. 6).

The ramping process continues until the output value of pump 20, Vout, exceeds the value of Vreg, the regulation value. When the value of Vout exceeds the value of Vreg the output of comparator 16 will change state, causing the output of FF 36 to change state in response to the next positive edge of clock C2 (t6 in FIG. 6). In response to the change in the output of FF 36 Logic 42 inhibits clock CP so that the output of pump 20, Vout, no longer increases. Since the output of FF 36 is also connected to the set input, S, of RSFF 40 the change in the output state of FF 36 causes a change in the output state of RSFF 40, Rsout. Because the output of RSFF 40, Rsout, is connected to the control input of clock logic 38, the change in Rsout inhibits clock C4 and switch 44 exclusively connects the output of register 32 to the input of the D/A converter 14. As a result the output of D/A converter 14, DAout, will exclusively equal the value of Vreg and the comparator 16 will continuously compare the value of the pump 20 output, Vout, to the desired regulation voltage, Vreg. If the value of Vout decreases to a value less than the value of Vreg, the output of comparator 16 will change state, and the output state of DFF 36 will change in response to a positive transition of clock C2. In response to the change in the output state of DFF 36 logic 42 will cease to inhibit clock C3 and the resulting changes in the value of CP in response to changes in clock C3 will cause the output value of pump 20, Vout, to increase until the value of Vout again exceeds the value of Vreg. This process of regulating Vout to a value greater than or equal to the value of Vreg will continue as long as Vout is needed, as for example programming or erasing NVM. The output state of RSFF 40, Rsout, will not respond to any additional changes in the output state of FF 36, however. Rsout will not change again until the reset signal RESET causes the output of RSFF 40, Rsout, to change state. This operation continues as shown in FIG. 6 for times t9, t10, t11, t12, and t13.

Figure 7:
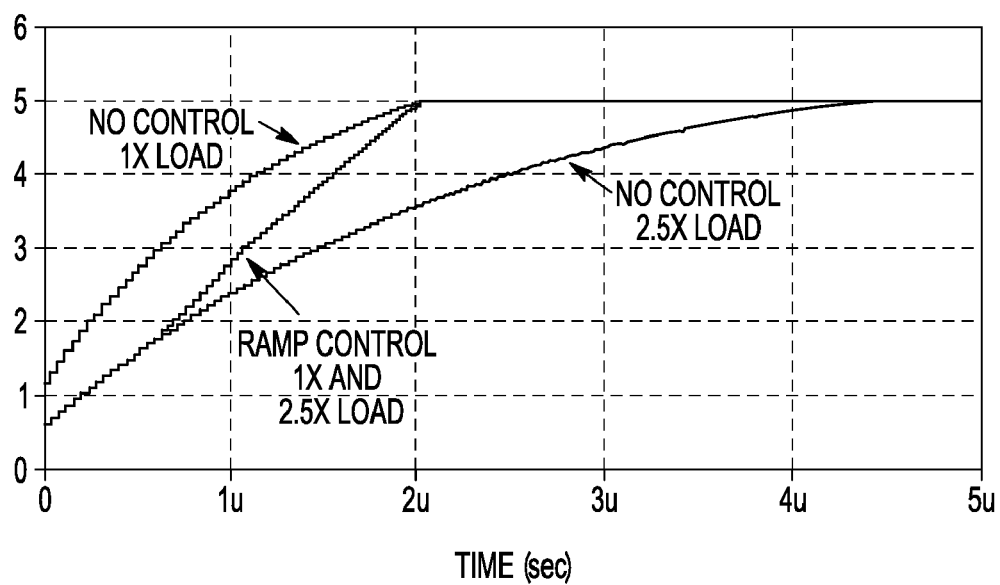
FIG. 7 a graph showing a charge pump characteristic of the prior art and the charge pump of FIG. 5.

FIG. 7 illustrates the operation of the charge pump of the prior art and the operation of the invention under a variety of loads. The left-most trace, labeled "No Control, 1× Load", is the operation of the charge pump of the prior art with a minimal load. The output value of the pump reaches the regulation value in approximately 2 us. The right-most trace, labeled "No Control, 2.5× Load", is the operation of the charge pump of the prior art when the load is increased to two and a half times the minimal load. The output value of the pump reaches the regulation value in approximately 4 us. The difference in ramp rate between the minimal load case and the larger load case is unacceptable for certain applications. The middle trace in FIG. 7, labeled "Ramp Control, 1× and 2.5× Load", illustrates the operation of the invention with both the minimal and the two and a half times loads. Since the ramp rate of the output value of the pump is identical for both loads, it is clearly superior to the prior art.

By now it should be appreciated that there has been provided a charge pump having a first counter and a pump stage. The first counter has a control input for receiving a control signal, and an output for providing a first count value, wherein the first count value is incremented in response to the control signal being a first logic state and the first count value is decremented in response to the control signal being a second logic state. The pump stage has a variable capacitor, the variable capacitor having a control input coupled to the output of the first counter for receiving the first count value, wherein a capacitance value of the variable capacitor is changed in response to the first count value changing, and wherein the capacitance value is for determining a ramp-up rate of an output voltage at an output of the charge pump. The charge pump may further include a second counter having an output for providing a second count value, a digital-to-analog converter having an input coupled to the output of the second counter, and an output for providing an analog representation of the second count value, and a comparator having a first input coupled to the output of the digital-to-analog converter, a second input coupled to the output of the charge pump, and an output for providing the control signal to the control input of the first counter. The charge pump may further include a switch coupled between the output of the second counter and the input of the digital-to-analog converter, the switch having a control input for receiving a first clock signal. The charge pump may further include a register for storing a digital value corresponding to a desired output voltage at the output of the charge pump, the register having an output selectively coupled to the input of the digital-to-analog converter, wherein the switch alternately couples the second count value and the digital value to the input of the digital-to-analog converter in response to the first clock signal. The charge pump may further include a first flip-flop having an input coupled to the output of the comparator, an output coupled to the control input of the variable capacitor, and a clock input for receiving a second clock signal and a second flip-flop having an input coupled to the output of the comparator, an output coupled to the pump stage, and a clock input for receiving a third clock signal. The charge pump may have a further characterization by which the second clock signal and the third clock signal are characterized as being non-overlapping clock signals. The charge pump may have a further characterization by which the first flip-flop responds to rising edges of the second clock signal and second flip-flop responds to rising edges of the third clock signal. The charge pump may have a further characterization by which the first counter includes a first register for storing an interval value, the first register having an output, an adder having a first input coupled to the output of the first register, a second input, a control input, and an output, and a second register having in input coupled to the output of the adder, and an output coupled to the second input of the adder. The charge pump may have a further characterization by which the charge pump is implemented on a single integrated circuit.

Also described is a charge pump including a first counter having an output for providing a first count value. The charge pump further includes a digital-to-analog converter having an input coupled to the output of the first counter, and an output for providing an analog representation of the first count value. The charge pump further includes a comparator having a first input coupled to the output of the digital-to-analog converter, a second input, and an output. The charge pump further includes a second counter having an input coupled to the output of the comparator, and an output for providing a second count value. The charge pump further includes a pump stage having an input, an output coupled to the second input of the comparator, and a variable capacitor, a capacitance value of the variable capacitor being changed in response to the second count value. The charge pump may have a further characterization by which the first counter comprises a first register having an output, an adder having a first input coupled to the output of the first register, a second input, and an output, and a second register having an input coupled to the output of the adder, and an output coupled to the second input of the adder. The charge pump may have a further characterization by which the second counter comprises a third register having an output, an adder/subtractor having a first input coupled to the output of the third register, a second input, and an output, and a fourth register having an input coupled to the output of the adder/subtractor, and an output coupled to the second input of the adder/subtractor. The charge pump may further include a fifth register for storing a digital value corresponding to a desired output voltage at the output of the pump stage, wherein the digital value and the first count value are alternately provided to the input of the digital-to-analog converter. The charge pump may further include a switch, the switch for alternately coupling the output of the second register and an output of the fifth register to the input of the digital-to-analog converter in response to a clock signal. The charge pump may further include a first logic circuit coupled between the output of the comparator and the input of the second counter. The charge pump may have a further characterization by which the charge pump is implemented in a single integrated circuit.

Described also is a charge pump including a first counter having an output for providing a first count value. The charge pump further includes a digital-to-analog converter having an input and an output. The charge pump further includes a first register for storing a digital value corresponding to a desired output voltage at an output of the charge pump. The charge pump further includes a switch having a first terminal coupled to the output of the first register, a second terminal coupled to the output of the first counter, and a third terminal coupled to the input of the digital-to-analog converter, wherein the digital value and the first count value are alternately provided to the input of the digital-to-analog converter in response to a clock signal. The charge pump further includes a comparator having a first input coupled to the output of the digital-to-analog converter, a second input, and an output. The charge pump further includes a second counter having an input coupled to the output of the comparator, and an output for providing a second count value. The charge pump further includes a pump stage having a variable capacitor, the variable capacitor having an input coupled to the output of the second counter for receiving the second count value, the pump stage having an output coupled to the second input of the comparator, the pump stage having a clock input coupled to the output of the comparator. The charge pump may have a further characterization by which the second counter is an up/down counter, wherein the up/down counter increments the second count value in response to the output of the comparator being a first logic state, and the up/down counter decrements the second count value in response to the output of the comparator being a second logic state. The charge pump may have a further characterization by which the first counter includes a first register having an output, an adder having a first input coupled to the output of the first register, a second input, and an output, and a second register having an input coupled to the output of the adder, and an output coupled to the second input of the adder. The charge pump may have a further characterization by which the second counter comprises a first register having an output, an adder/subtractor having a first input coupled to the output of the first register, a second input, and an output, and a second register having an input coupled to the output of the adder/subtractor, and an output coupled to the second input of the adder/subtractor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, clocks may be reversed and events may occur on falling edges instead of rising edges or any combination of rising edges and falling edges. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A charge pump comprising:
a first counter having a control input for receiving a control signal, and an output for providing a first count value, wherein the first count value is incremented in response to the control signal being a first logic state and the first count value is decremented in response to the control signal being a second logic state;
a pump stage having a variable capacitor, the variable capacitor having a control input coupled to the output of the first counter for receiving the first count value, wherein a capacitance value of the variable capacitor is changed in response to the first count value changing, and wherein the capacitance value is for determining a ramp-up rate of an output voltage at an output of the charge pump;
a second counter having an output for providing a second count value;
a digital-to-analog converter having an input coupled to the output of the second counter, and an output for providing an analog representation of the second count value;
a comparator having a first input coupled to the output of the digital-to-analog converter, a second input coupled to the output of the charge pump, and an output for providing the control signal to the control input of the first counter; and
a switch coupled between the output of the second counter and the input of the digital-to-analog converter, the switch having a control input for receiving a first clock signal.

2. The charge pump of claim 1, further comprising:
a register for storing a digital value corresponding to a desired output voltage at the output of the charge pump, the register having an output selectively coupled to the input of the digital-to-analog converter;
wherein the switch alternately couples the second count value and the digital value to the input of the digital-to-analog converter in response to the first clock signal.

3. The charge pump of claim 2, further comprising:
a first flip-flop having an input coupled to the output of the comparator, an output coupled to the control input of the variable capacitor, and a clock input for receiving a second clock signal; and
a second flip-flop having an input coupled to the output of the comparator, an output coupled to the pump stage, and a clock input for receiving a third clock signal.

4. The charge pump of claim 3, wherein the second clock signal and the third clock signal are characterized as being non-overlapping clock signals.

5. The charge pump of claim 3, wherein the first flip-flop responds to rising edges of the second clock signal and second flip-flop responds to rising edges of the third clock signal.

6. The charge pump of claim 1, wherein the first counter comprises:
a first register for storing an interval value, the first register having an output;
an adder having a first input coupled to the output of the first register, a second input, a control input, and an output; and
a second register having in input coupled to the output of the adder, and an output coupled to the second input of the adder.

7. The charge pump of claim 1, wherein the charge pump is implemented on a single integrated circuit.

8. A charge pump comprising:
a first counter having an output for providing a first count value;
a digital-to-analog converter having an input coupled to the output of the first counter, and an output for providing an analog representation of the first count value;
a comparator having a first input coupled to the output of the digital-to-analog converter, a second input, and an output;
a second counter having an input coupled to the output of the comparator, and an output for providing a second count value;
a pump stage having an input, an output coupled to the second input of the comparator, and a variable capacitor, a capacitance value of the variable capacitor being changed in response to the second count value;
wherein the first counter comprises:
a first register having an output;
an adder having a first input coupled to the output of the first register, a second input, and an output; and
a second register having an input coupled to the output of the adder, and an output coupled to the second input of the adder;
wherein the second counter comprises:
a third register having an output
an adder/subtractor having a first input coupled to the output of the third register, a second input, and an output;
a fourth register having an input coupled to the output of the adder/subtractor, and an output coupled to the second input of the adder/subtractor; and
a fifth register for storing a digital value corresponding to a desired output voltage at the output of the pump stage, wherein the digital value and the first count value are alternately provided to the input of the digital-to-analog converter.

9. The charge pump of claim 8, further comprising a switch, the switch for alternately coupling the output of the second register and an output of the fifth register to the input of the digital-to-analog converter in response to a clock signal.

10. The charge pump of claim 8, further comprising a first logic circuit coupled between the output of the comparator and the input of the second counter.

11. The charge pump of claim 8, wherein the charge pump is implemented in a single integrated circuit.

12. A charge pump comprising:
a first counter having an output for providing a first count value;

a digital-to-analog converter having an input and an output;

a first register for storing a digital value corresponding to a desired output voltage at an output of the charge pump;

a switch having a first terminal coupled to the output of the first register, a second terminal coupled to the output of the first counter, and a third terminal coupled to the input of the digital-to-analog converter, wherein the digital value and the first count value are alternately provided to the input of the digital-to-analog converter in response to a clock signal;

a comparator having a first input coupled to the output of the digital-to-analog converter, a second input, and an output;

a second counter having an input coupled to the output of the comparator, and an output for providing a second count value; and a pump stage having a variable capacitor, the variable capacitor having an input coupled to the output of the second counter for receiving the second count value, the pump stage having an output coupled to the second input of the comparator, the pump stage having a clock input coupled to the output of the comparator.

13. The charge pump of claim 12, wherein the second counter is an up/down counter, wherein the up/down counter increments the second count value in response to the output of the comparator being a first logic state, and the up/down counter decrements the second count value in response to the output of the comparator being a second logic state.

14. The charge pump of claim 12, wherein the first counter comprises:
   a first register having an output;
   an adder having a first input coupled to the output of the first register, a second input, and an output; and
   a second register having an input coupled to the output of the adder, and an output coupled to the second input of the adder.

15. The charge pump of claim 12, wherein the second counter comprises:
   a first register having an output;
   an adder/subtractor having a first input coupled to the output of the first register, a second input, and an output; and
   a second register having an input coupled to the output of the adder/subtractor, and an output coupled to the second input of the adder/subtractor.

* * * * *